INVENTORS.
Franz Gustav Rheude
Franz Munster
Harald Brehmer

BY Spencer & Kaye
ATTORNEYS

United States Patent Office 3,687,714
Patented Aug. 29, 1972

3,687,714
PROCESS FOR MAKING A MATERIAL FOR SHOE OR BOOT MANUFACTURE
Franz Gustav Rheude, Speyer, Franz Munster, Limburgerhof, Pfalz, and Harald Brehmer, Neuhofen, Pfalz, Germany, assignors to Gebr. Giulini G.m.b.H., Ludwigshafen (Rhine), Germany
Filed Oct. 28, 1970, Ser. No. 84,605
Claims priority, application Germany, Oct. 30, 1969, P 19 54 687.3
Int. Cl. C09j 7/04
U.S. Cl. 117—68.5          8 Claims

ABSTRACT OF THE DISCLOSURE

In a method for manufacturing shoes or boots, a material forming a stiffener and a foot-contacting surface is made by providing a fabric with an aqueous dispersion containing 10–35 weight-percent butadiene-styrene copolymer having carboxyl groups, smoothing one surface of the dispersion on the fabric, solidifying the dispersion for bonding the fibers of the fabric together, reinforcing the side of the fabric opposite to the smoothed side with a thermoplastic coating, and placing on the thermoplastic coating an adhesive for enabling lamination.

BACKGROUND OF THE INVENTION

The present invention relates to a method for making a material forming the stiffening and lining of boots or shoes.

If one will feel the portions of his shoes surrounding his heels, we will usually note that such portions are stiffer than the portions at his metatarsi, for instance. The shoe component providing this stiffening is called the counter. The counter gives a shoe its permanence of shape, determines its particular stylish appearance, and offers an additional guarding of the foot from external influences.

It is known to use thermoplastic counter materials for stiffening shoes or shoe parts. Such materials are produced by coating woven material, felts, or fleece with synthetic resin solutions or dispersions. Examples of resins which have been used or polyvinyl acetate, polyacrylic ester, and butadiene-styrene copolymer. These coated fabrics are laminated on one side with a lining in the form of flocked woven material or else paper material, while the other side of the coated fabrics is provide with a thermoplastic adhesive layer.

After the fabric has been coated with a synthetic resin solution or dispersion, it is dried in a tunnel drier or on a drum drier. Following this drying, it is laminated with the flocked woven material or with the paper material, then again dried, and finally provided with a heat sealing adhesive or hot-melt. Lengths of the resulting material are then cut to plates and counters are blanked out of the plates. In the assembly section of a shoe manufacturing operation, these counters are then sewn or ironed to the leather uppers at the heel sections of the shoes. Working and forming of the counters proceeds on heel preform or heel forming lasting machines using steam or other means of heating and pressure to render them soft, malleable, formable and adhesive on one side.

SUMMARY OF THE INVENTION

An object of the present invention is to provide a method of making a material forming a stiffener and a foot-contacting surface in a shoe or boot.

Another object of the invention is to provide a method for making a material forming a shoe or boot counter and having one surface of sufficient quality to serve in place of a separate liner to contact a person's foot in a boot or shoe.

Yet another object of the present invention is to provide a method for making a material forming a shoe or boot counter and having one surface of such quality that a separate step of providing a liner laminated to the counter can be eliminated in the manufacture of a shoe or boot, the surface of the counter itself forming the foot-contacting surface.

These as well as other objects which will become apparent in the discussion that follows are achieved, according to the present invention, by impregnating and/or coating a fabric such as a woven material, felt, fleece or a chopped-strand mat with an aqueous dispersion containing 10–35 weight-percent butadiene-styrene copolymer having carboxyl groups, this weight-percent being based on the ratio of the weight of the copolymer to the total weight of the dispersion, smoothing one surface of the dispersion on the fabric, solidifying the dispersion for bonding the fibers of the fabric together, reinforcing the side of the fabric opposite to the smoothed side with a thermoplastic coating, and placing on the thermoplastic coating an adhesive for enabling lamination for instance to the leather upper at the heel section of a shoe.

The side which has undergone the smoothing presents an abrasion-resistant, suede-like surface in the final product, and it renders unnecessary an inner lining of the counter when the product is used as the counter in a shoe or boot.

The material of the present invention is also applicable for stiffening the tips of boots or shoes.

DESCRIPTION OF THE PREFFERED EMBODIMENTS

Preferably, the aqueous dispersion contains 15–20 weight-percent butadiene-styrene copolymer having carboxyl groups. The step of solidifying the dispersion may be accomplished by high frequency, heat, pressure, or by a combination of these methods.

After a partial solidification, the step of reinforcing is carried out by coating one side of the fabric with an aqueous dispersion containing 20–30, more preferably 25, weight-percent styrene homo- or copolymer, and 20–30, more preferably 25, weight-percent of an acrylic acid copolymer. After this coating, the fabric is placed in a dryer for finally solidifying the butadiene-styrene-based dispersion and for solidifying the reinforcing dispersion. Weight percentages here are based on the ratio of the weight of the particular copolymer to the total weight of the dispersion.

Another successful dispersion which can be coated onto the fabric in the step of reinforcing is an aqueous dispersion containing 30–50, preferably 40, weight-percent styrene-butadiene-acrylonitrile terpolymer, where such percentages are calculated on the basis of the following formula:

$$\text{Weight-percent terpolymer} = 100 \times \frac{\text{weight of terpolymer}}{\text{total weight of (dispersoid + solute)}}$$

The solidified thermoplastic coating applied in the step of reinforcing is then provided with an adhesive material such as polystyrene, which is rendered adhesive by exposing it to ethyl acetate, or such as a heat sealing adhesive or a hotmelt.

The invention is further illustrated by the following examples:

EXAMPLE I

Figure 1:
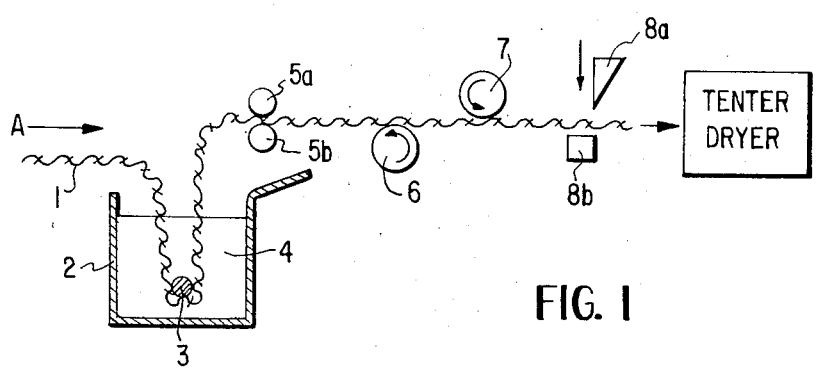
FIG. 1 is a schematic illustration of a part of the method according to the invention.

Referring to FIG. 1, a twill-weave cotton fabric 1, weighing 170 grams per square meter and strongly roughened on both sides, is moved in the direction of arrow A into tank 2, around post 3, and then out. This causes an impregnation of the fabric with a dispersion 4 of the following composition:

| | Kg. |
|---|---|
| Water | 14.7514 |
| Sodium tripolyphosphate | 0.2066 |
| Titanium dioxide | 8.3600 |
| Kaolin | 25.5800 |
| Red pigment | 0.0490 |
| Black pigment | 0.0049 |
| Yellow pigment | 0.0340 |
| Acrylic acid copolymer | 19.0000 |
| Latex of butadiene-styrene copolymer having carboxyl groups | 31.0000 |
| Ammonium bicarbonate | 1.0000 |
| Silicone antifoam 20%-emulsion | 0.0200 |

Upon leaving the tank 2, the fabric is drawn between freely rotating rolls 5a and 5b, which are spaced to form a gap of 0.95 millimeter between them. Passing the fabric between these rolls brings the amount of impregnated dispersion to 470 grams per square meter dry substance. Then the fabric 1 passes over a smoothing roll 6 which rotates counterclockwise in the drawing so as to have a tangential velocity opposite to the fabric velocity at the point of contact and which smooths the underside of the impregnated fabric. The fabric bears against roll 6 with a pressure of 3 to 6 atmospheres gage pressure. Next, the upper side is roughened by a like roll 7 rotating counterclockwise in the drawing so as to have a tangential velocity in the same direction as the fabric velocity at the point of contact. Shearing tool 8a, 8b then cuts fabric 1 into lengths which are predried in a tenter dryer having a stretching frame adjusted to a 1340 millimeter width and an average temperature of 120° C., until the amount of water left in the impregnated fabric equals 10% of the weight of the fabric in the dried, impregnated state.

Figure 2:
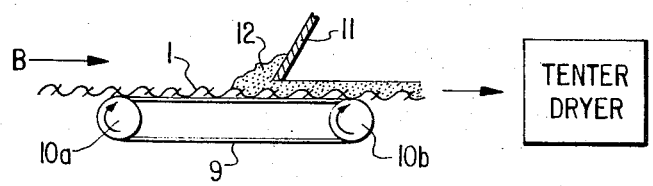
FIG. 2 is a schematic illustration of a second part of the method according to the invention.

Referring now to FIG. 2, the lengths of predried fabric leaving the tenter dryer are conveyed in the direction of arrow B by rubber belt 9 and conveyor rolls 10a and 10b past a doctor blade 11 for coating a thermoplastic reinforcing dispersion 12 onto the side of the fabric roughened by roll 7. This dispersion is applied to the fabric in an amount equal to 100 grams per square meter. The composition of the dispersion is as follows:

| | Kg. |
|---|---|
| Water | 56.0 |
| Acrylic acid copolymer | 22.0 |
| Polystyrene | 22.0 |

The thus coated lengths are then placed in a tenter dryer having a temperature of 130° C., where the amount of water left in the fabric is reduced to equal about 2% of the weight of the fabric is a dried, impregnated and coated state. The impregnated dispersion 4 is now solidified and bonds the fibers of the fabric together, while the coated dispersion 12 is also solidified and serves as reinforcement.

Figure 3:
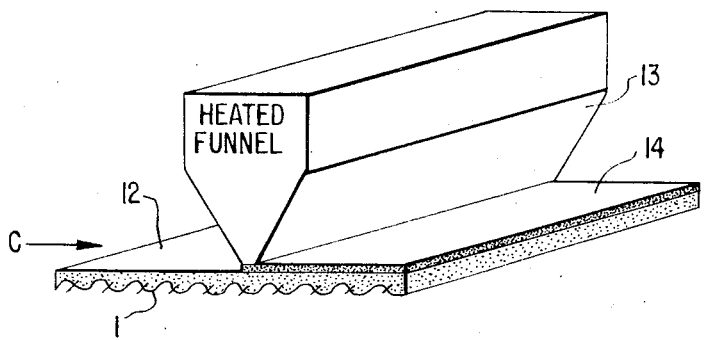
FIG. 3 is a schematic illustration of a third part of the method according to the invention.

Referring now to FIG. 3, the lengths of fabric leaving the tenter dryer in FIG. 2 are forwarded in the direction of arrow C and the surface is coated with molten hotmelt 14 which discharges from the heated funnel 13 and has the following composition:

| | Kg. |
|---|---|
| Hydrocarbon resin | 56.0 |
| Resin-modified maleic resin | 10.0 |
| Ethylene-vinylacetate rubber | 30.0 |
| 2-mercaptobenzimidazole | 1.0 |
| 2,2-methylene-bis(4-methyl-6-tertbutylphenol) [1] | 1.0 |
| Chloroparaffin | 1.0 |
| Organic acid | 1.0 |

[1] Formula:

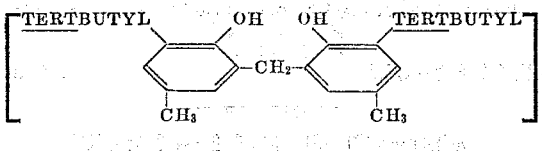

Upon solidification of the hotmelt, the lengths of fabric are cut to sheets measuring about 900 by 1300 millimeters. Several of these sheets are placed in a stack and pieces for counters are blanked out of the stacks.

Figure 4:
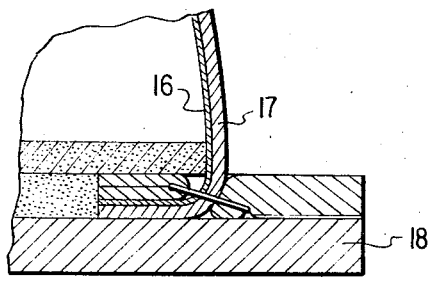
FIG. 4 is an elevational cross section through the heel portion of a shoe.

FIG. 4 shows a counter 16 made of the material of this Example I. It has been laminated to leather 17 by the hotmelt. The exposed surface of counter 16 is that which was smoothed by roll 6. This exposed surface serves as the lining of the shoe and contacts the sock of the wearer. Part 18 is the heel. All other structural parts shown in FIG. 4 are as designated in U.S. Pat. No. 3,298,116, issued Jan. 17, 1967, to Albert Barker for "Footwear." Forming of the counter 16 into the desired shape is accomplished as above described in the section entitled "Background of the Invention."

EXAMPLE II

A plain-weave cotton fabric, weighing 170 grams per square meter and strongly roughened on both sides, is coated using an apparatus like that comprised of parts 9, 10a, 10b, and 11 in FIG. 2. Used for the coating is a dispersion based on the following formulation:

| | Kg. |
|---|---|
| Water | 15.6580 |
| Sodium tripolyphosphate | 0.2160 |
| Titanium dioxide | 8.8770 |
| Kaolin | 27.1540 |
| Red pigment | 0.0522 |
| Black pigment | 0.0052 |
| Yellow pigment | 0.0365 |
| Melamine-formaldehyde resin | 7.1000 |
| Catalyst | 0.9000 |
| Latex of butadiene-styrene copolymer having carboxyl groups | 40.0000 |
| Silicone antifoam 20%-emulsion | 0.0200 |

This dispersion is diluted with water until original dispersion makes up 63 weight percent of the total diluted liquid. It is coated onto the fabric in an amount equal to 400 grams per square meter.

Immediately upon passing the doctor blade, the coating is smoothed wtih a roll similar to roll 6 in FIG. 1 having a tangential velocity opposite to the fabric velocity at the point of contact.

Lengths of the coated fabric are then suspended from one end in a drying chamber having a temperature of 130° C. and the amount of water in the coated fabric is reduced to equal 15% of the weight of the fabric in a dried, coated state.

Upon reaching 15 weight-percent water content, the fabric lengths are removed from the drying chamber and forwarded to a coating apparatus also like that comprised of parts 9, 10a, 10b and 11 in FIG. 2, where the following dispersion is applied as reinforcement onto the side of the fabric opposite to that carrying the butadienestyrene-based dispersion, in an amount equal to 400 grams per square meter:

| | Kg. |
|---|---|
| Styrene-butadiene-acrylonitrile terpolymerlatex (52%-latex) | 79.00 |
| Centrifuge latex (caoutchouc milk) (62%-latex) | 21.00 |
| Silicone antifoam 20%-emulsion | 0.02 |

Then the water content is reduced to about 2 weight-percent as in Example I above. This is followed by application of the hotmelt of Example I and blanking of pieces for counters.

EXAMPLE III

One proceeds exactly as in Example I using all the same materials and procedures through the achievement of a 2 weight-percent water content.

Then the side containing the reinforcing coating is coated using an apparatus of the type illustrated in FIG. 2 comprising parts 9, 10a, 10b, and 11 with an aqueous polystyrene dispersion in an amount equal to 200 grams per square meter. The polystyrene dispersion contains 45 weight-percent polystyrene as calculated on the total weight of the dispersion. After drying, sheets measuring 900 by 1300 millimeters are cut and stacked. Pieces to be shaped into counters are blanked out of the stacks.

EXAMPLE IV

One proceeds exactly as in Example II using all the same materials and procedures through the drying to reduce the water content to 15 weight-percent.

Upon reaching 15 weight-percent water content, the fabric lengths are removed from the tenter dryer and coated using an apparatus of the type illustrated in FIG. 2 comprising parts 9, 10a, 10b, and 11. Used as the reinforcing coating material is an aqueous polystyrene dispersion. This coating material is applied to the side of the fabric opposite to that carrying the butadiene-styrene-based dispersion, in an amount equal to 450 grams per square meter. The coating material contains 45 weight-percent polystyrene as calculated on the total weight of the dispersion. After drying, sheets measuring 900 by 1300 millimeters are cut and stacked. Pieces to be shaped into counters are blanked out of the stacks. In this embodiment the reinforcing coating of polystyrene, is rendered adhesive by exposing it to ethyl acetate, so that a hotmelt is not needed.

It will be understood that the above description of the present invention is susceptible to various modifications, changes and adaptations and the same are intended to be comprehended within the meaning and range of equivalents of the appended claims.

The butadiene - styrene copolymers having carboxyl groups are terpolymers. Monomers which may be used in the preparation of these terpolymers of butadiene-styrene include: unsaturated carboxylic acids, esters of acrylic or methacrylic acid, nitriles of acrylic or methacrylic acid or the like whereby the ester and nitrile groups in the formed terpolymer must be hydrolysed.

The weight ratio of butadine to styrene to carboxylic acid usually ranges from 40:59.9:0.1 to 80:2:18 and preferably from 55:42:3 to 65:26:9. The dispersion having a viscosity of near 1200 c.p. contains 50–60 weight-percent preferably 56–58 weight-percent of solid matter, and can be mixed with fillers, for example kaolin and aluminia, with pigments and thickeners, for example with ammonium salts of poly-acrylic acid or the like. Alginates can also be used. The butadiene-styrene copolymers having carboxyl groups can be mixed with latices of reactive resins, for example melamine formaldehyde resins.

The acrylic acid copolymers which may be employed in the manufacture of thermoplastic reinforcing coating are for example "Acronal," produced by Badische Anilin- & Soda-Fabrik AG.

We claim:

1. In a method for manufacturing shoes or boots, the method of making a material forming a stiffener and a foot-contacting surface, comprising the steps of providing a woven fabric, roughened on both sides, with an aqueous dispersion containing 10–35 weight-percent butadiene-styrene copolymer having carboxyl groups, smoothing one surface of the dispersion on the fabric, solidifying said dispersion for bonding the fibers of said fabric together, reinforcing the side of said fabric opposite to the smoothed side with a thermoplastic coating selected from the group consisting of thermoplastic coatings consisting essentially of polymers based on styrene and acrylic acid, thermoplastic coatings containing styrene-butadiene - acrylonitrile terpolymer, and thermoplastic coatings of polystyrene, and placing on said thermoplastic coating an adhesive for enabling lamination.

2. A method as claimed in claim 1 wherein said aqueous dispersion contains 15–20 weight-percent butadiene-styrene copolymer having carboxyl groups.

3. A method as claimed in claim 1 wherein said thermoplastic coating consists essentially of polymers based on styrene and acrylic acid, and wherein said adhesive is a hotmelt adhesive.

4. A method as claimed in claim 1 wherein said thermoplastic coating contains styrene-butadiene-acrylonitrile terpolymer, and wherein said adhesive is a hotmelt adhesive.

5. A method as claimed in claim 1 wherein said thermoplastic coating consists essentially of polymers based on styrene and acrylic acid, and wherein said adhesive is polystyrene.

6. A method as claimed in claim 1 wherein said thermoplastic coating contains styrene-butadiene-acrylonitrile terpolymer, and wherein said adhesive is polystyrene.

7. A method as claimed in claim 1 wherein said thermoplastic coating and wherein said adhesive is polystyrene.

8. A method as claimed in claim 1 wherein said adhesive is polystyrene and the placing includes applying the polystyrene to the thermoplastic coating in the form of an aqueous dispersion of polystyrene.

References Cited

UNITED STATES PATENTS

| 3,055,496 | 9/1962 | Dunlap | 117—122 X |
|---|---|---|---|
| 3,471,315 | 10/1969 | Böe et al. | 117—122 |
| 3,020,169 | 2/1962 | Phillips et al. | 117—68.5 X |
| 2,341,713 | 2/1944 | Griswold | 117—122 X |
| 2,487,060 | 11/1949 | Pike et al. | 117—76 |
| 2,897,960 | 8/1959 | Revoir | 117—76 X |
| 3,399,165 | 8/1968 | Berger et al. | 117—122 X |
| 2,848,105 | 8/1958 | Bartell et al. | 117—76 X |

WILLIAM D. MARTIN, Primary Examiner

B. D. PIANALTO, Assistant Examiner

U.S. Cl. X.R.

117—64 R, 76 A, 122 H, 122 S, 145, 146